(12) United States Patent
Zaman

(10) Patent No.: US 9,511,850 B2
(45) Date of Patent: Dec. 6, 2016

(54) WING TIP DEVICE FOR AN AIRCRAFT WING

(71) Applicant: The Boeing Company, Chicago, IL (US)

(72) Inventor: AbuMuhammed A. Zaman, Renton, WA (US)

(73) Assignee: The Boeing Company, Chicago, IL (US)

( * ) Notice: Subject to any disclaimer, the term of this patent is extended or adjusted under 35 U.S.C. 154(b) by 308 days.

(21) Appl. No.: 14/251,601

(22) Filed: Apr. 12, 2014

(65) Prior Publication Data

US 2016/0144951 A1 May 26, 2016

(51) Int. Cl.
*B64C 23/00* (2006.01)
*B64C 23/06* (2006.01)
*B64F 5/00* (2006.01)

(52) U.S. Cl.
CPC ........... *B64C 23/065* (2013.01); *B64F 5/0036* (2013.01); *Y02T 50/164* (2013.01)

(58) Field of Classification Search
CPC .................................. B64C 23/065; B64C 5/08
See application file for complete search history.

(56) References Cited

U.S. PATENT DOCUMENTS

| | | |
|---|---|---|
| 1,466,551 A | 7/1923 | Thurston |
| 1,841,921 A | 1/1932 | Spiegel |
| 1,888,418 A | 11/1932 | Adams |
| 2,576,981 A | 2/1951 | Vogt |
| 2,743,888 A | 5/1956 | Lippisch |
| 3,027,118 A | 1/1960 | Willox |
| 3,027,098 A | 9/1966 | Cone |
| 3,270,988 A | 9/1966 | Cone |
| 3,712,564 A | 1/1973 | Rethorst |
| 3,840,199 A | 10/1974 | Tibbs |
| 4,046,336 A | 9/1977 | Tangier |
| 4,108,403 A | 8/1978 | Finch |
| 4,172,574 A | 10/1979 | Spillman |
| 4,190,219 A | 2/1980 | Hackett |
| 4,205,810 A | 6/1980 | Ishimitsu |
| 4,245,804 A | 1/1981 | Ishimitsu |
| 4,247,063 A * | 1/1981 | Jenkins ................. B64C 23/065 244/199.4 |
| 4,365,773 A | 12/1982 | Wolkovitch |

(Continued)

FOREIGN PATENT DOCUMENTS

| | | |
|---|---|---|
| DE | 634884 | 9/1936 |
| DE | 2149956 | 4/1973 |

(Continued)

OTHER PUBLICATIONS

Extended European Search Report, Application No. 15161275.1-1757, dated Aug. 31, 2015.

(Continued)

*Primary Examiner* — Tien Dinh
*Assistant Examiner* — Richard R Green

(57) ABSTRACT

A wing tip device for an aircraft wing may include an upper winglet and a lower element. The upper winglet may extend upwardly from an aircraft wing. The lower element may extend downwardly from the upper winglet and may form a closed loop below the wing. The closed loop may have a hollow interior.

24 Claims, 10 Drawing Sheets

(56) References Cited

U.S. PATENT DOCUMENTS

| | | |
|---|---|---|
| 4,382,569 A | 5/1983 | Boppe |
| 4,455,004 A | 6/1984 | Whitaker |
| 4,457,479 A | 7/1984 | Daude |
| 4,541,593 A | 9/1985 | Cabral |
| 4,545,552 A | 10/1985 | Welles |
| 4,595,160 A | 6/1986 | Santos |
| 4,667,906 A | 5/1987 | Suarez et al. |
| 4,671,473 A | 6/1987 | Goodson |
| 4,674,709 A | 6/1987 | Welles |
| 4,700,911 A | 10/1987 | Zimmer |
| 4,714,215 A | 12/1987 | Jupp |
| 4,722,499 A | 2/1988 | Klug |
| 4,776,542 A | 10/1988 | Van Dam |
| 5,039,032 A | 8/1991 | Rudolph |
| 5,082,204 A | 1/1992 | Croston |
| 5,102,068 A | 4/1992 | Gratzer |
| 5,156,358 A | 10/1992 | Gerhardt |
| 5,275,358 A | 1/1994 | Goldhammer |
| 5,348,253 A | 9/1994 | Gratzer |
| 5,407,153 A | 4/1995 | Kirk |
| 5,435,504 A | 7/1995 | Inoue |
| 5,634,613 A | 6/1997 | McCarthy |
| 5,788,191 A | 8/1998 | Wake |
| 5,909,858 A | 6/1999 | Hawley |
| 5,975,464 A | 11/1999 | Rutan |
| 5,992,793 A | 11/1999 | Perry |
| 6,089,502 A | 7/2000 | Herrick |
| 6,161,797 A | 12/2000 | Kirk |
| 6,345,790 B1 | 2/2002 | Brix |
| 6,474,604 B1 | 11/2002 | Carlow |
| 6,484,968 B2 | 11/2002 | Felker |
| 6,547,181 B1 | 4/2003 | Hoisinaton |
| 6,578,798 B1 | 6/2003 | Dizdarevic |
| 6,726,149 B2 | 4/2004 | Wojciechowski |
| 6,827,314 B2 | 12/2004 | Barriety |
| 6,886,778 B2 | 5/2005 | McLean |
| 6,929,219 B2 | 8/2005 | Wojciechowski |
| 7,048,228 B2 | 5/2006 | Vassberg |
| 7,275,722 B2 | 10/2007 | Irving |
| 7,988,100 B2 | 8/2011 | Mann |
| 8,128,035 B2 * | 3/2012 | Malachowski ....... B64C 23/065 244/130 |
| 2004/0155146 A1 | 8/2004 | Wyrembek |
| 2005/0184196 A1 | 8/2005 | Shmilovich |
| 2006/0027703 A1 | 2/2006 | Bussom |
| 2007/0018049 A1 | 1/2007 | Stuhr |
| 2008/0191099 A1 | 8/2008 | Werthmann |
| 2009/0039204 A1 | 2/2009 | Eberhardt |
| 2009/0084904 A1 | 4/2009 | Detert |
| 2009/0224107 A1 | 9/2009 | McLean |
| 2009/0256029 A1 | 10/2009 | Malachowski |
| 2011/0272530 A1 | 11/2011 | Mann |
| 2012/0312928 A1 | 12/2012 | Gratzer |
| 2012/0312929 A1 | 12/2012 | Gratzer |
| 2013/0256460 A1 | 10/2013 | Roman et al. |

FOREIGN PATENT DOCUMENTS

| | | |
|---|---|---|
| DE | 19926832 | 1/2001 |
| EP | 0094064 | 11/1983 |
| EP | 0113466 | 7/1984 |
| EP | 1493660 | 1/2005 |
| FR | 2334562 A1 | 7/1977 |
| FR | 2780700 | 1/2000 |
| WO | WO2012/007358 | 1/2012 |

OTHER PUBLICATIONS

AERO "Blended Winglets Improve Performance," Mar. 2009.

AERO "Blended Winglets for Improved Airplane Performance," Jan. 2002.

Unroad Warrier "Wing Tips: Boeing vs. Airbus," Mar. 28, 2011.

Smartcockpit.com, "Understanding Winglets Technology," retrieved on Mar. 23, 2012.

Flight Global—Flight Blogger, "Blended scimitar-tipped split winglet," Oct. 17, 2011, available at <http://www.flightglobal.com/blogs/flightblogger/2011/10/split-scimitar-winglet-next-on.html>.

Flight Global, "NBAA: Aviation Partners splits winglets," Oct. 11, 2011, available at <http://www.flightglobal.com/news/articles/nbaa-aviation-partners-splits-winglets-for-performance-boost-363281/>.

Tourism and Aviation, "Airbus sues Aviatin Partners," Mar. 23, 2012.

European Search Report for EP13161307, dated Dec. 12, 2013.

PCT International Search Report for PCT/US2008/076055 U.S. Appl. No. 11/866,209); Jun. 8 2006, European Patent Office.

Pfenninger et al., "About the Design Philosphy of Long Range LFC Transports with Advanced Supercrilical LFC Airfoils," AIM 19th Fluid Dynamics, Plasma Dynamics and Laser Conference, AIAA 87. Jun. 8-10, 1987.

Whitcomb, Richard T., "A Design Approach and Selected Wind-Tunnel Results at High Subsonic Speeds for Wing-Tip Mounted Winglets," NASA Technical Note 8260—National Aeronautics and Space Administration—Washington D.C., Jul. 1976.

Wilcox el al. Stimultuneous Optimization of a Multiple-Aircraft Family: Journal of Aircraft, Jul. 2003 pp. 616-622.

Desktopaero, Wing Design Parameters (4 pages) http://www.desktopaero.com/appliedaero/wingdesignwingparams.html.

Boeing Aero, From Aero No. 17, Blended Winglets, accessed Jun. 19, 2012.

Cone, "The Theory of Induced Lift and Minimum Induced Drag of Non-Planar Lifting Systems," NASA Technical Report R-139 National Aeronautics and Space Administration, Issued Aug. 16, 1963.

Craig et al., "Spanload Optimization for Strength Designed Lifting Surfaces," AIM 6th Applied Aerodynamics Conference, The Boeing Company, Jul. 6-8, 1988.

Design and Analysis of Winglets for Military Aircraft. Technical Report AFFDL-TR-76-3, Feb. 1976.

Kroo, I., Non-Planar Wing Concepts for Increased Aircraft Efficiency, Lecture series on Innovative Configurations and Advanced Concepts for Future Civil Aircraft, Jun. 6-10, 2005, 29 pages.

La Roche et al., Wing-Grid, a Novel Device for Reduction of Induced Drag on Wings, La Roche Consulting presented at ICAS 96 in Sorrento, Italy.

McLean, Doug, Wingtip Devices: What They Do and How They Do it. Boeing Aerodynamics—Article 4, 2005. 20 pages.

Flechner et al., "Experimental Results of Wing Tests on First, Second, and Third Generation Jet Transports," NASA Technical Memorandum 72674, May 1978.

* cited by examiner

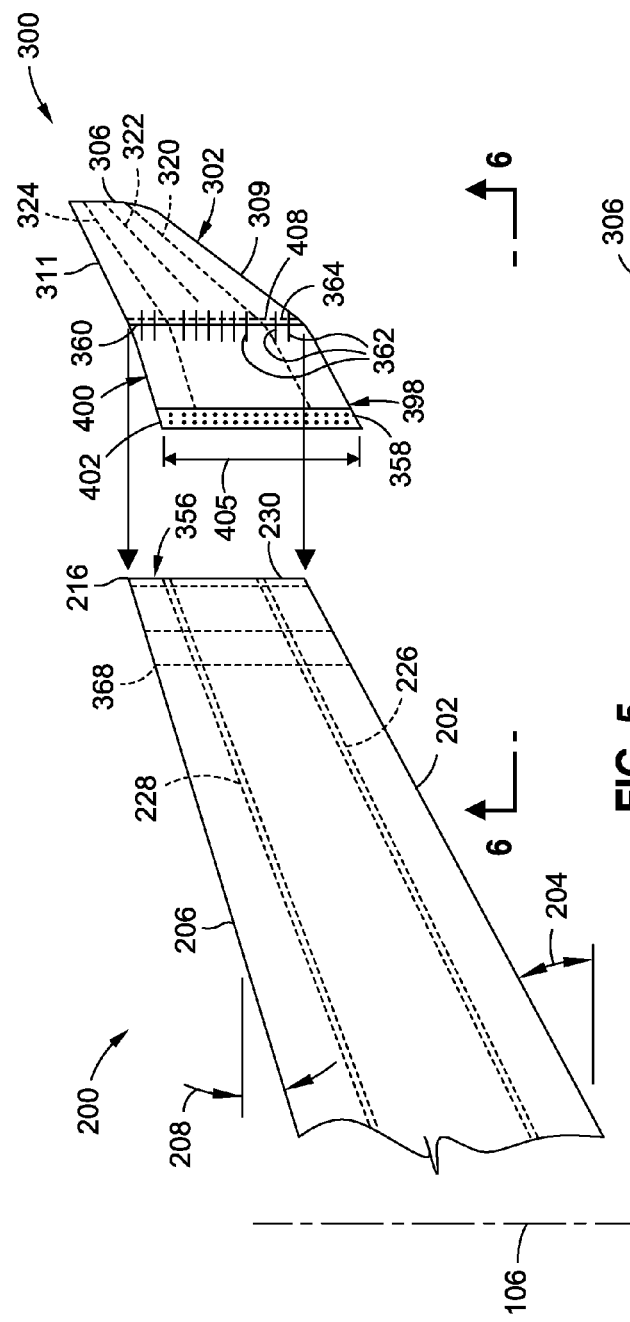
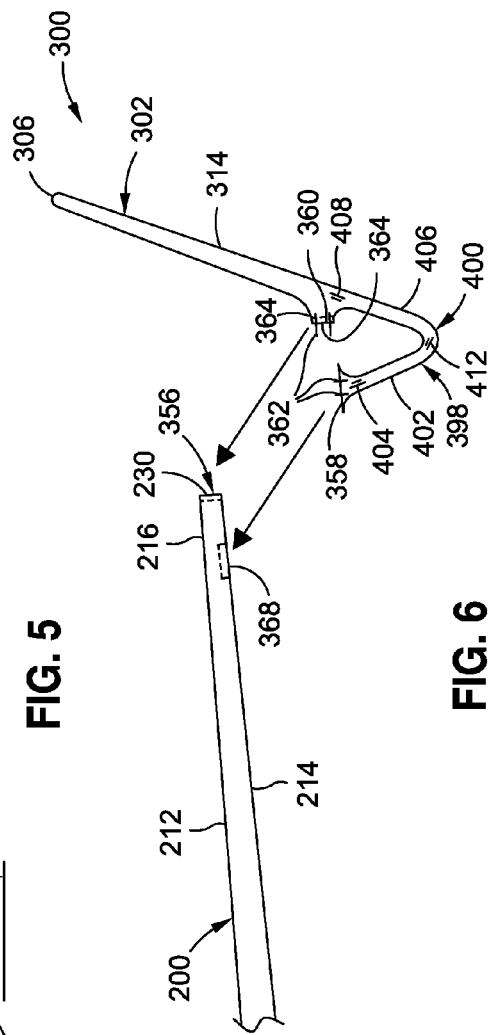
FIG. 5
FIG. 6

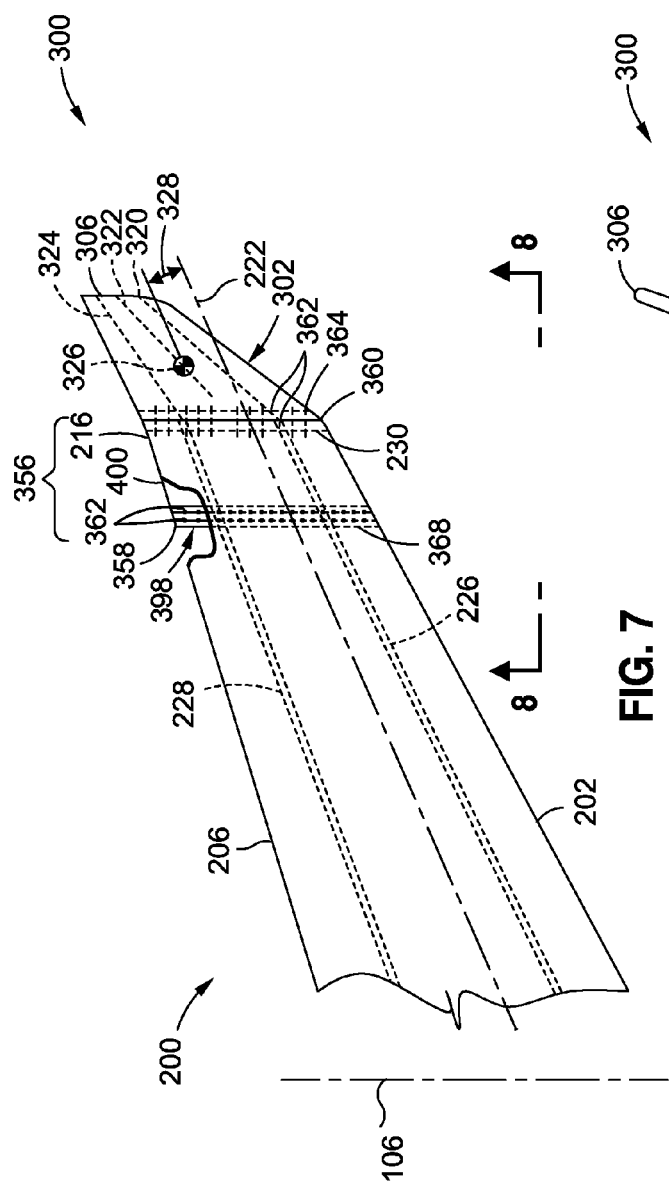
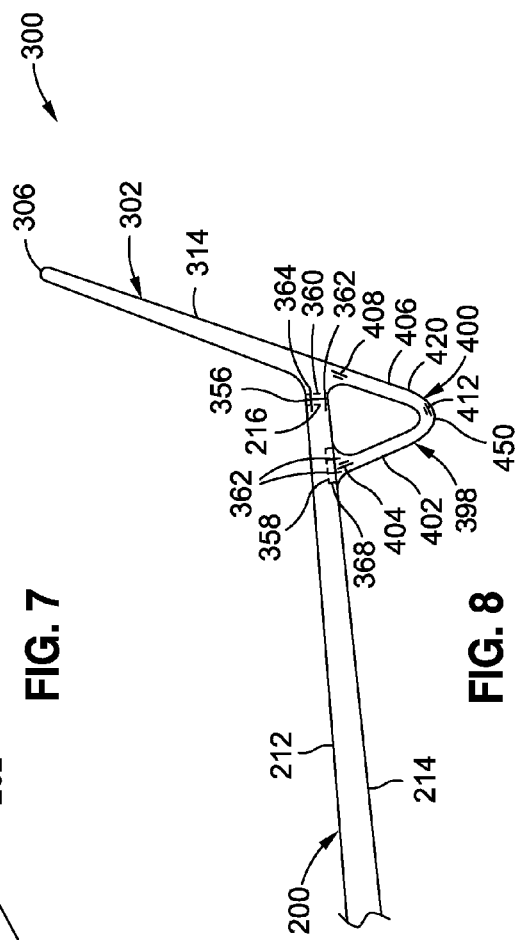
FIG. 7
FIG. 8

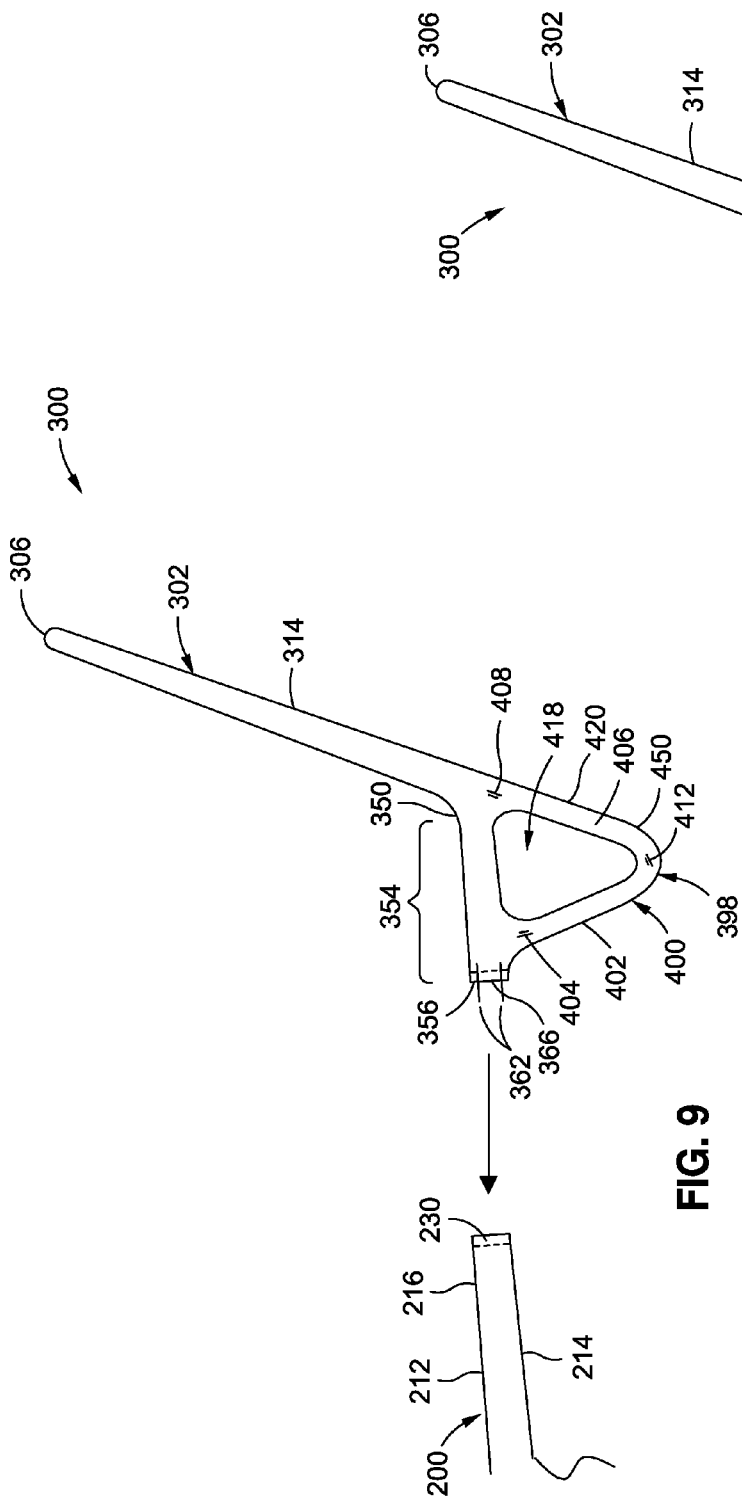

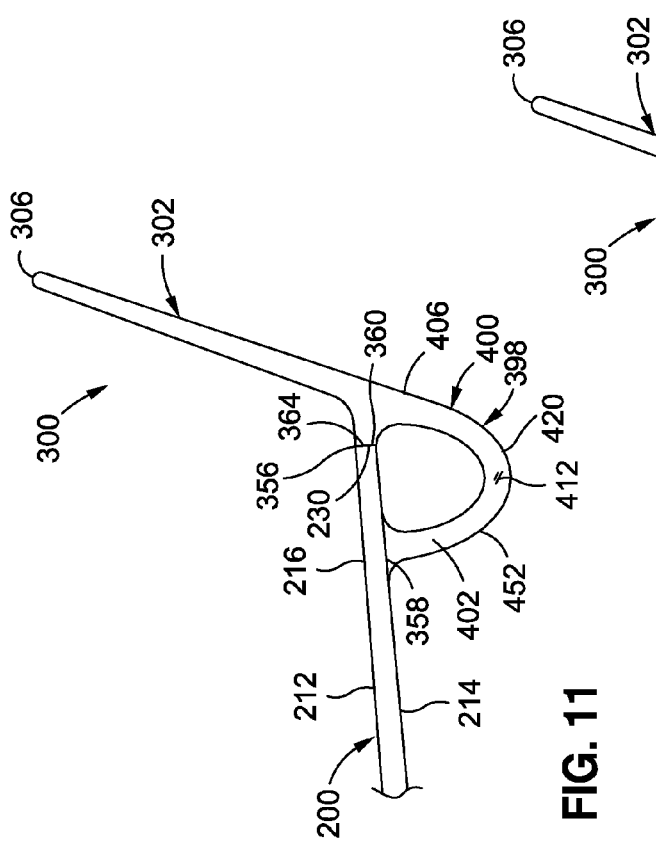
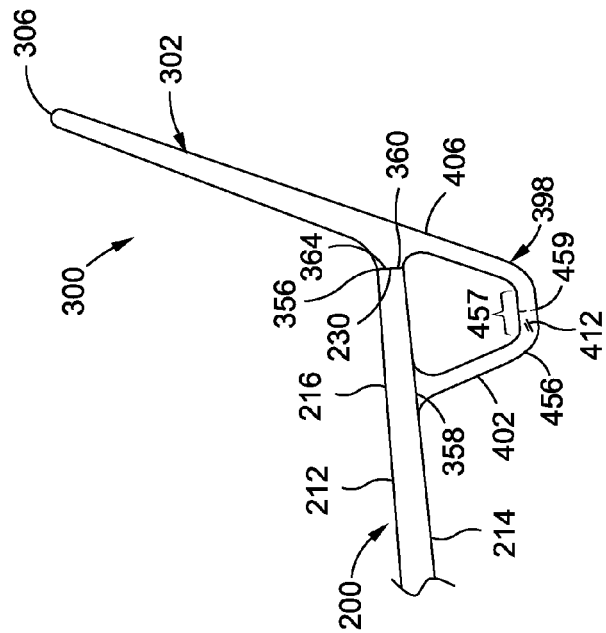
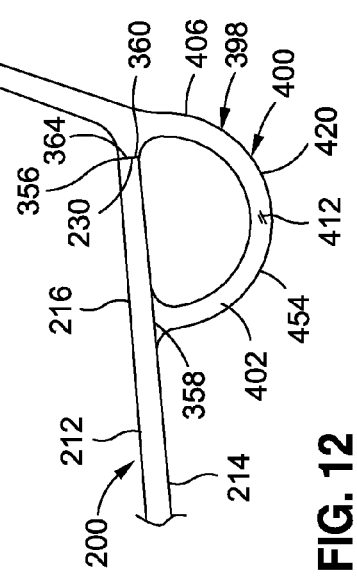

WING TIP DEVICE FOR AN AIRCRAFT WING

BACKGROUND

The present disclosure relates generally to aerodynamics and, more particularly, to a wing tip device such as for a wing of an aircraft.

BACKGROUND

Induced drag of an aircraft wing may be described as the aerodynamic drag that is generated due to the redirection of air over the wing as the wing moves through the air. The redirection of the air may include a spanwise flow of air along the underside of the wing in a generally outboard direction toward the wing tip. When the spanwise flow of air reaches the wing tip, the air flows upwardly over the wing tip and joins a chordwise flow of air moving over the top of the wing. The joining of the spanwise flow of air with the chordwise flow of air results in the formation of wing tip vortices.

The wing tip vortices are fed by other vortices that are shed as downwash along the trailing edge of the wing. The wing tip vortices and the downwash of trailing edge vortices cause the wing lift to be inclined in a slightly aftward direction. The slightly aftward inclination of the wing lift may also be described as a reduction in the effective angle of attack of the wing, and may result in a reduction in the payload capacity of the aircraft and/or a decrease in the range and/or fuel efficiency of the aircraft.

As can be seen, there exists a need in the art for a wing tip configuration that reduces the amount of induced drag generated by a wing.

SUMMARY

The above-noted needs associated with induced drag are specifically addressed by the present disclosure which provides a wing tip device for an aircraft wing. The wing tip device may include an upper winglet and a lower element. The upper winglet may extend upwardly from an aircraft wing. The lower element may extend downwardly from the upper winglet and may form a closed loop below the wing. The closed loop may have a hollow interior to allow air to pass through the closed loop. The upper winglet and the lower element may have an airfoil cross-section such that the upper winglet and the lower element may generate aerodynamic lift.

Also disclosed is a method of configuring a wing of an aircraft wing with a wing tip device. The method may include extending an upper winglet upwardly from a wing tip. The method may additionally include extending a lower element extending downwardly from the upper winglet. In addition, the method may include forming the lower element into a closed loop below the wing such that the closed loop has a hollow interior.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 5 is a top exploded view of an embodiment of a wing tip device separated from a wing;

FIG. 6 is a front view of the wing tip device taken along line 6 of FIG. 5 and illustrating the wing tip joint located outboard of the inboard end of the lower arc;

FIG. 7 is a top assembled view of the wing tip device of FIG. 5 coupled to the wing tip using mechanical fasteners;

FIG. 8 is a front view of the wing tip device taken along line 8 of FIG. 7 and illustrating the wing tip joint located outboard of the inboard end of the lower arc;

FIG. 9 is an exploded front view of an embodiment of the wing tip device wherein the wing tip joint is located inboard of the inboard end of the lower arc;

FIG. 10 is an assembled front view of the wing tip device of FIG. 9 joined to the wing tip;

FIG. 11 is a front view of an embodiment of a wing tip device wherein the lower arc has a parabolic shape;

FIG. 12 is a front view of an embodiment of a wing tip device wherein the lower arc has a semi-circular shape;

FIG. 13 is a front view of an embodiment of a wing tip device wherein the lower arc has a trapezoidal shape;

DETAILED DESCRIPTION

Figure 1:
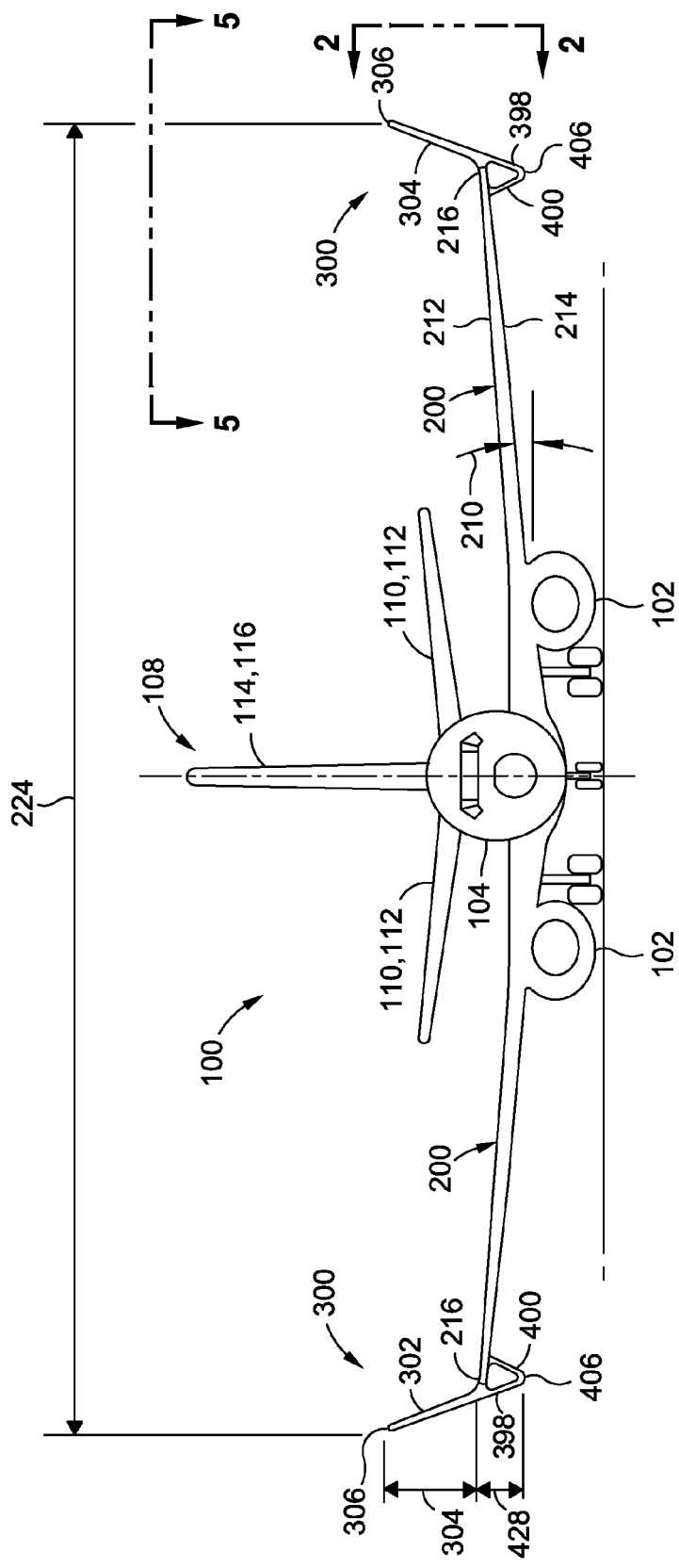
FIG. 1 is front view of an aircraft incorporating an embodiment of a wing tip device for reducing the induced drag of a wing.

Referring now to the drawings wherein the showings are for purposes of illustrating various embodiments of the disclosure, shown in FIG. 1 is a front view of an aircraft 100 having a pair of wings 200 and incorporating an example of a wing tip device 300 coupled to each wing 200. As described in greater detail below, the various embodiments of the wing tip device 300 disclosed herein include an upper winglet 302 and a lower element 398. Advantageously, the combination of the upper winglet 302 and the lower element 398 provide an increase in the effective length of the wing trailing edge 206 (FIG. 5) without increasing the wing span 224 of the wings 200. In this manner, the wing tip devices 300 allow for a reduction in the induced drag generated by the wings 200.

In FIG. 1, the aircraft 100 may include a fuselage 104 having a longitudinal axis 106 that may extend lengthwise along the fuselage 104. As indicated above, the aircraft 100 may include a pair of wings 200 which may be attached to the fuselage 104. Each one of the wings 200 may extend outwardly from the fuselage 104 in a spanwise direction toward a wing tip 216. The wings 200 may have a wing span 224 defined as the distance between the tips of the upper winglets 302 of the wing tip devices 300. In the embodiment shown, the wings 200 may be oriented at a dihedral angle 210 which may be defined as the angle of the wings 200 relative to horizontal when the wings are subjected to a 1-g static ground loading. The wings 200 may also be swept aftwardly (FIG. 7). However, the aircraft 100 may be configured such that the wings 200 have no sweep, or the wings 200 may be swept forwardly. Each one of the wings 200 may include one or more control surfaces (not shown) such as leading edge devices, trailing edge devices, and/or spoilers. The leading edge devices (not shown) may include leading edge slats and/or Krueger flaps or other leading edge devices. The trailing edge devices (not shown) may include trailing edge flaps, flaperons, ailerons, and/or other trailing edge device configurations.

In FIG. 1, the aircraft 100 may include one or more propulsion units 102 which may be mounted to the wings 200 or at other locations on the aircraft 100. The aircraft 100 may include an empennage 108 at the aft end of the fuselage 104. The empennage 108 may include a horizontal tail and a vertical tail. The horizontal tail may include one or more horizontal stabilizers 110. Each horizontal stabilizer 110 may include an elevator 112 that may be pivotably coupled to the horizontal stabilizer 110. The vertical tail may include a vertical stabilizer 114 and a rudder 116 for directional control of the aircraft 100. Although the wing tip device 300 of the present disclosure is described in the context of a tube-and-wing aircraft 100 as shown in FIG. 1, the wing tip device 300 may be implemented in any aircraft configuration, without limitation, including a blended-wing configuration, a hybrid wing-body configuration, and other aircraft configurations. Furthermore, although the wing tip device 300 is described in the context of implementation on an aircraft wing 200, the wing tip device 300 may be implemented on airfoils other than wings 200. For example, a wing tip device 300 may be incorporated on a tip of a horizontal stabilizer 110 or on a tip of a canard to reduce the negative effects of induced drag.

Figure 2:
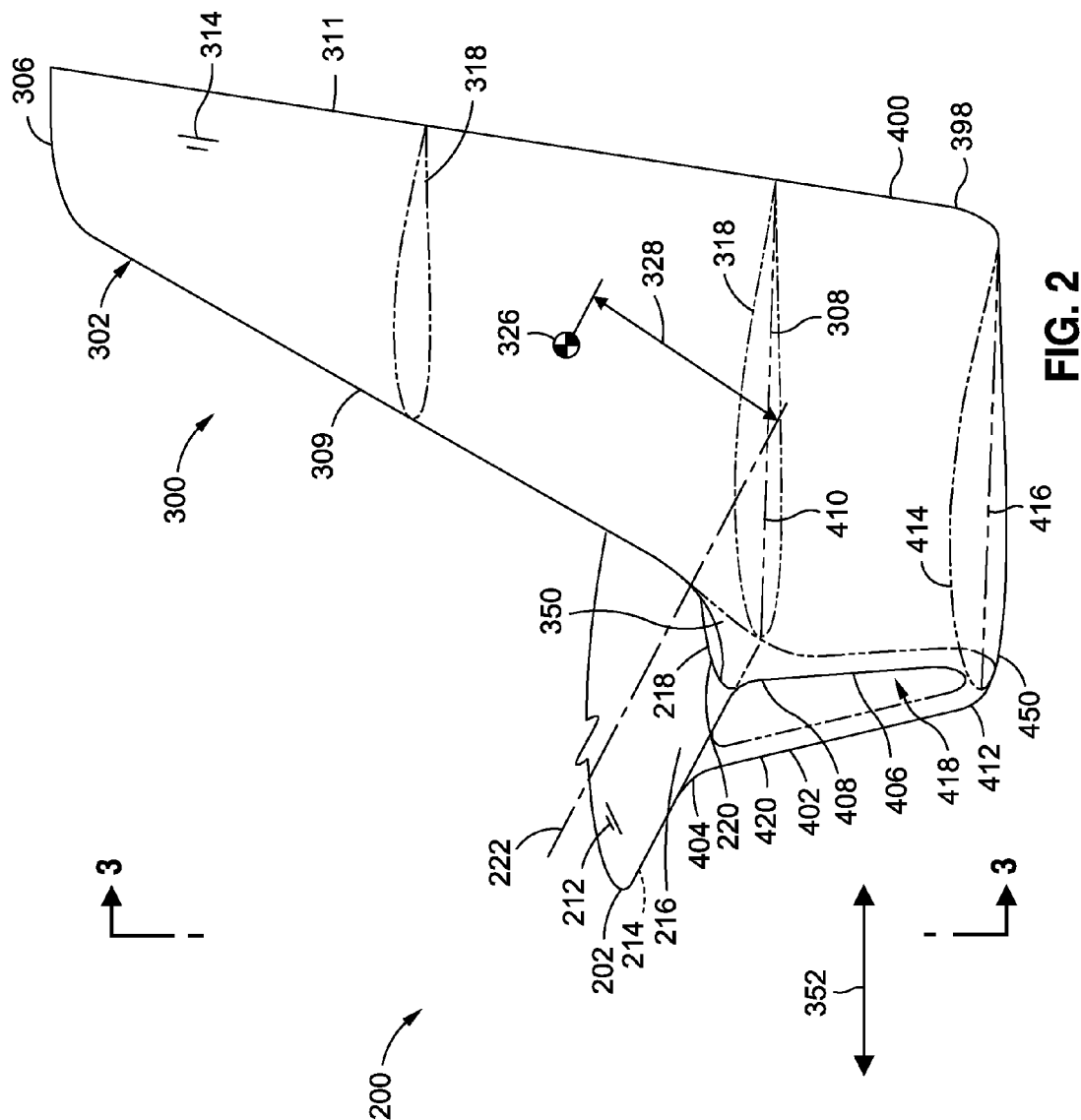
FIG. 2 is a side view of an embodiment of a wing tip device having an upper winglet and a lower element.

In FIG. 2, shown is an embodiment of a wing tip device 300 having an upper winglet 302 and a lower element 398. The upper winglet 302 may extend upwardly from the wing tip 216. The upper winglet 302 may have an upper winglet airfoil section 318 to generate positive lift. In some examples, the upper winglet 302 may extend upwardly in a generally straight or non-curved direction. However, the upper winglet 302 may have a curved shape (not shown) and/or a slightly bowed shape (not shown) and/or a slightly twisted shape (not shown), The upper winglet 302 may extend upwardly at a dihedral angle 316 (FIG. 3) which may be selected to provide the desired aerodynamic performance characteristics.

In an embodiment, the lower element 398 (FIG. 1) may be formed as an inverted lower arc 400. The lower element 398 may have an airfoil cross-section to generate positive lift. The outboard portion 406 of the lower element 398 may extend downwardly from the upper winglet 302. The lower element 398 may be positioned underneath the wing 200. The lower element 398 may include an inboard end 404 and an outboard end 408. The lower arc 400 may be joined to a wing lower surface 214 of the wing 200 and may form a closed loop 420 with the wing lower surface 214. The closed loop 420 may have a hollow interior 418 extending through the lower element 398 along a forward/aft direction 352 of the aircraft 100. The hollow interior 418 may allow airflow to pass through the closed loop 420 such that the lower element 398 may generate lift.

By configuring the wing tip device 300 as a combination of the upper winglet 302 and the lower element 398, the length of the upper winglet 302 may be reduced relative to the length of a conventional single upper winglet (not shown). The combination of the upper winglet 302 and the lower arc 400 may provide a desired increase in the effective length of the wing trailing edge 206 (FIG. 5). Furthermore, by reducing the length of the upper winglet 302, the bending moment at the root of the upper winglet 302 due to aerodynamic loading of the upper winglet 302 may be reduced. A reduction in the bending moment at the root of the upper winglet 302 may reduce the strength and torsional stiffness requirements of the wing 200 which may translate into a reduction in the weight of the wing 200.

In addition, by providing the wing tip device 300 with a lower element 398, the generation of tip vortices from a downwardly-extending winglet (not shown) may be avoided. Avoidance of tip vortices may reduce the negative effects of induced drag. Furthermore, by providing the wing tip device 300 with a lower element 398, the wing tip device 300 may have a reduced vertical height 428 relative to a downwardly extending winglet (not shown). For example, in FIG. 1, the lower element 398 may extend a relatively short distance below the wing 200 which may provide improved clearance of the wing tip device 300 with objects or ground support vehicles such as baggage trucks, belt loaders, catering trucks, and other ground support equipment operating around the aircraft 100 when parked at an airport or during ground operations of the aircraft 100.

Figure 3:
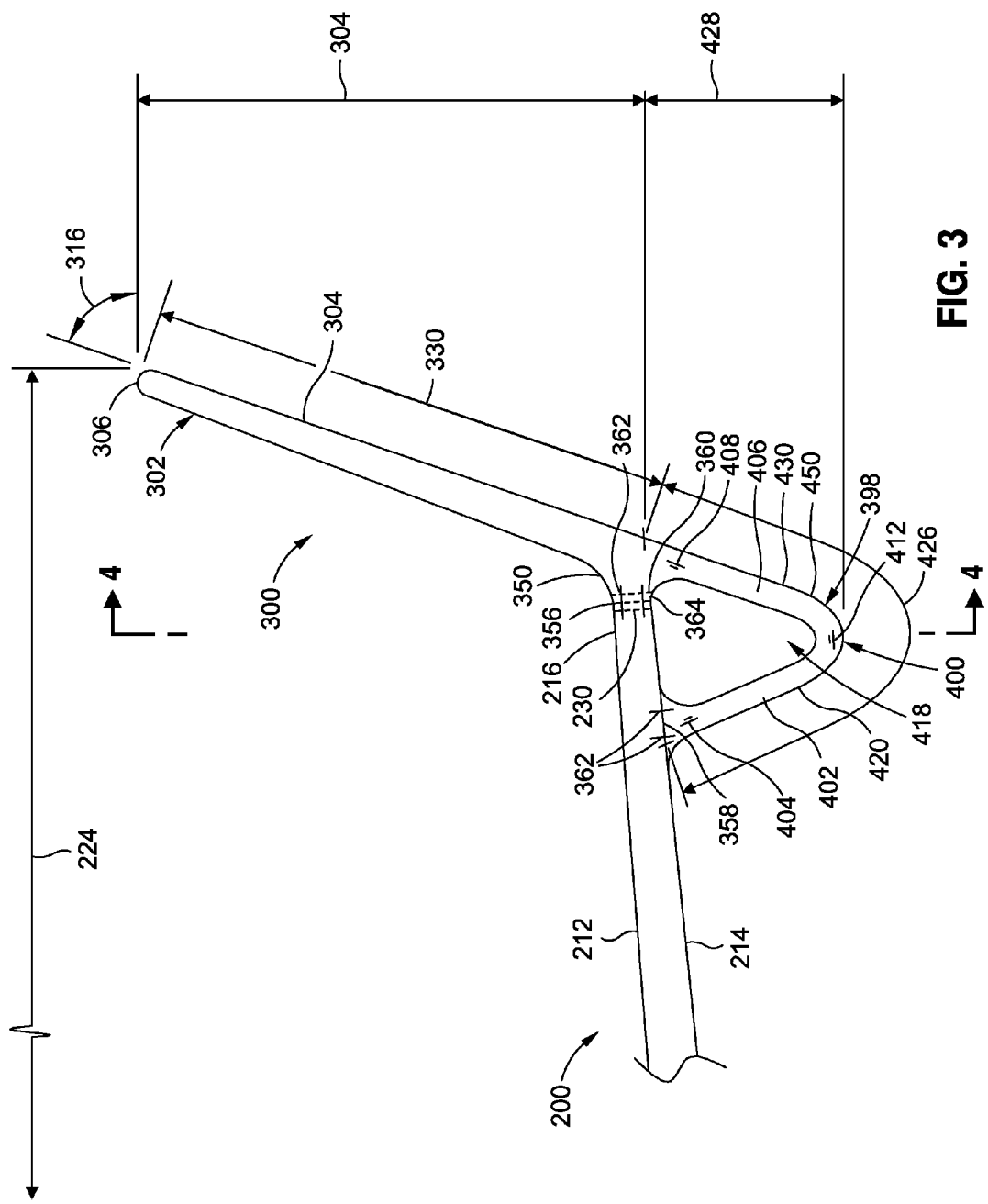
FIG. 3 is a front view of an embodiment of a wing tip device including the upper winglet and the lower element formed as a lower arc, the upper winglet and the lower arc being joined to the wing tip.

FIG. 3 shows an embodiment of a wing tip device 300 including the upper winglet 302 and the lower arc 400 joined to the wing 200. The wing 200 may have a wing upper surface 212 and a wing lower surface 214 and may terminate at a wing tip 216. As indicated above, the lower arc 400 may have an inboard end 404 and an outboard end 408, In some embodiments, the inboard end 404 may be joined to an underside of the wing 200 at a location inboard of the wing tip 216, The outboard end 408 may be joined to the upper winglet 302 and, in some embodiments, the outboard end 408 may be contiguous with the upper winglet 302. In some examples, the lower arc 400 outboard end 408 and the upper winglet 302 may be joined to the wing 200 at the wing tip 216. The wing tip device 300 may include a transition section 350 and/or one or more fillet radii or fairings on the upper and lower side of the wing at the location where the wing tip 216 transitions into the outboard end 408 and the upper winglet 302.

In FIG. 3, the lower element 398 is shown as having a generally triangular shape 450 when viewed along a forward/aft direction 352 (FIG. 2). In the embodiment shown, the inboard portion 402 and the outboard portion 406 may each being generally straight for a triangular configuration of the lower element 398. In addition, the lower element 398 may include a rounded lower portion 412. However, as described in greater detail below, the lower element 398 may be provided in any one of a variety of different sizes, shapes, and configurations, without limitation. In this regard, the lower element 398 may include one or more straight sections and/or one or more curved sections, and is not limited to a triangular shape 450.

The lower arc 400 may have an arclength 426 that may be described as the distance between the inboard end 404 and the outboard end 408 of the lower arc 400. More particularly, the arclength 426 of the lower arc 400 may be described as the distance measured along the outer surface 430 of the lower arc 400 from the intersection of the outer surface 430 with the wing lower surface 214 on the inboard end 404, to the intersection of the wing lower surface 214 with the outer surface 430 on the outboard end 408 of the lower arc 400. The upper winglet 302 may have a length 330 that may be defined as the distance from the intersection of the wing lower surface 214 with the outer surface 314 of the upper winglet 302, to the tip 306 of the upper winglet 302, measured along the outer surface 314 of the upper winglet 302. In some examples, the lower arc 400 may have an arclength 426 that is less than a length 330 of the upper winglet 302. By minimizing the arclength 426 of the lower arc 400, the vertical height 428 of the lower arc 400 may be reduced which may improve clearance of the lower arc 400 with vehicles and objects, and which may also may reduce the structural loading on the lower arc 400 caused by aerodynamic drag generated by the lower arc 400.

Referring to FIG. 3, in some examples, the wing tip device 300 may be configured such that the outboard portion 406 of the lower element 398 is located no further outboard than an outboard-most point (e.g., the tip 306) of the upper winglet 302 when the wing 200 is under a downwardly-deflected 1-g ground static loading from gravitational force acting on the mass of the wings 200, the propulsion units 102, fuel, and other components supported by the wings 200. In some embodiments, the wing tip device 300 may be configured such that the lower portion 412 of the lower element 398 is located below the wing lower surface 214 at a vertical distance of no more than approximately 50 percent of a vertical height 304 of the upper winglet 302 when the wing 200 is under the 1-g static ground loading. As indicated above, configuring the wing tip device 300 such that the lower element 398 extends a relatively short distance downwardly below the wing 200 may provide for improved clearance between the lower element 398 and objects or ground support vehicles relative to a reduced amount of clearance provided by a downwardly-extending winglet (not shown). However, the lower portion 412 of the lower element 398 may be located at any distance below the wing 200.

In FIG. 3, in some examples, the upper winglet 302 and the lower element 398 may be integrally formed as a one-piece structure. In this regard, the upper winglet 302 and the lower element 398 may be fabricated as a unitary structure which may simplify the design, manufacture, assembly, removal, and/or replacement of the wing tip device 300. In some examples, the upper winglet 302 may be continuous with the lower element 398. More particularly, the outer surface 430 of the outboard portion 406 of the lower element 398 may be tangent to and continuous with the outer surface 314 (FIG. 2) of the upper winglet 302. As indicated above, although the upper winglet 302 and outboard portion 406 of the lower element 398 are illustrated as being substantially straight, the upper winglet 302 and/or lower element 398 may be provided in any shape or configuration, without limitation. For example, the upper winglet 302 and the outboard portion 406 of the lower element 398 may be curved slightly inwardly or outwardly.

In some examples, the upper winglet 302 may be oriented at a dihedral angle 316 in the range of from approximately 10 to 90 degrees relative to horizontal. The dihedral angle 316 of the upper winglet 302 may be measured at the outer surface 314 of the upper winglet 302. The dihedral angle 316 of the upper winglet 302 may be the dihedral angle during upward deflection of the wing 200 under an approximate 1-g flight loading. In the example shown, the upper winglet 302 may be oriented at a dihedral angle 316 of at least approximately 60 degrees relative to horizontal and measured during upward deflection of the wing 200 under the approximate 1-g flight loading. As indicated above, the outer surface 314 of the upper winglet 302 is shown as being generally co-planar with the outer surface 430 of the outboard portion 406 of the lower element 398. However, the outer surface 314 of the upper winglet 302 may be oriented at a different dihedral angle 316 than the angle of the outer surface 430 of the outboard portion 406 of the lower element 398.

Figure 4:
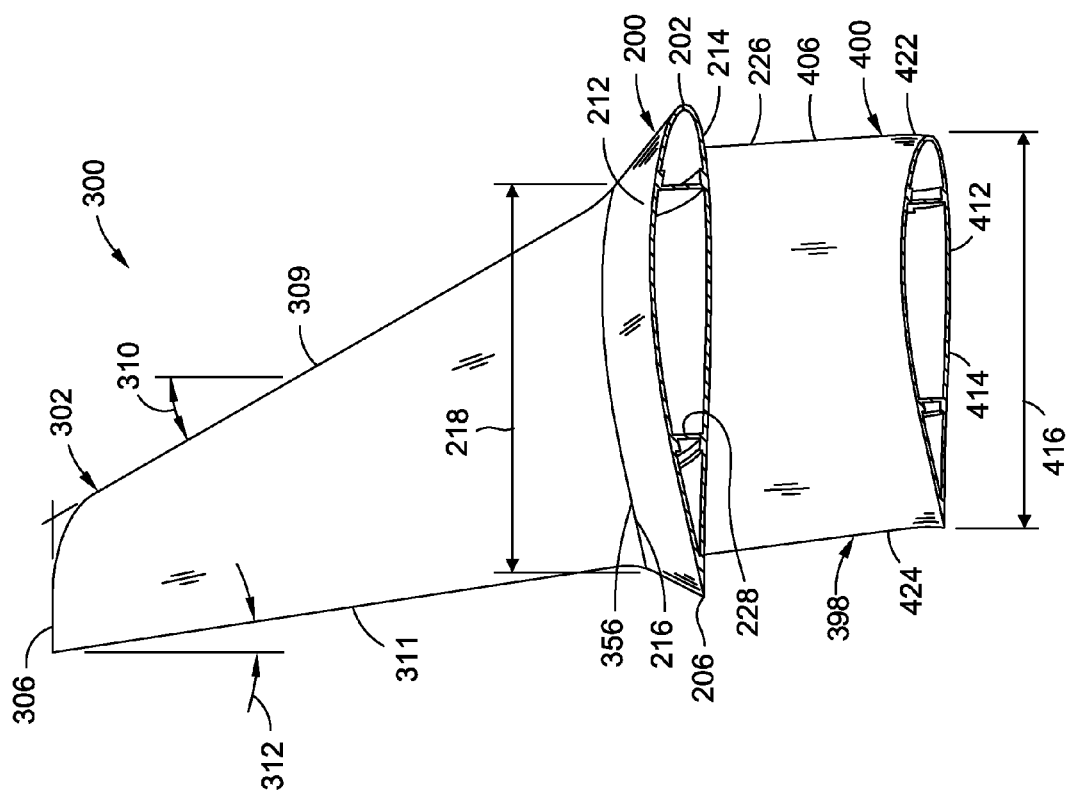
FIG. 4 is a sectional view taken along line 4 of FIG. 3 and illustrating an airfoil section of a tip extension of the upper winglet and an airfoil section of the lower arc.

FIG. 4 is a sectional view of an embodiment of a wing tip device 300 and illustrating an example of an airfoil section 220 of the wing 200 and an example of an airfoil section 414 of the lower portion 412 of the lower element 398. As indicated above, the airfoil section 318 of the lower element 398 and the upper winglet 302 may generate lift that may add to the lift generated by the wing 200. In the embodiment shown, the upper winglet 302 may include an upper winglet leading edge 309 that may be oriented at a leading edge sweep angle 310. In some examples, the upper winglet leading edge sweep angle 310 may be substantially similar to the leading edge sweep angle 204 (FIG. 5) of the wing 200. However, in other examples, the upper winglet leading edge sweep angle 310 may be greater than the leading edge sweep angle 204 of the wing 200. In some embodiments, the leading edge sweep angle 310 of the upper winglet 302 may be between approximately 20-70 degrees.

The upper winglet trailing edge 311 may be formed with a trailing edge sweep angle 312 that may be similar to or greater than the trailing edge sweep angle 208 of the wing 200. In the embodiment shown, the upper winglet 302 may be tapered along a direction from the upper winglet root chord 308 toward a tip 306 of the upper winglet 302. In some examples, the lower element 398 may include a leading edge 422 that may be angled inwardly along a direction from an upper portion (e.g., adjacent the wing lower surface 212) of the lower element 398 to the lower portion 412 when the lower element 398 (e.g., lower arc 400) is viewed from the side as shown in FIG. 4. Likewise the trailing edge 424 of the lower element 398 may be angled inwardly as shown in FIG. 4 such that the length of the chord 416 at the lower portion 412 may be shorter than the chord 405 at the inboard end 404 and/or the chord 410 at the outboard end 408.

The chord 416 (FIG. 2) of the lower portion 412 may be described as the chord of the airfoil section 414 at the bottom of the lower element 398. For example, in FIG. 3 showing the triangular shape 450 of the lower element 398, the lower portion chord 416 may be described as the chord at the bottom of the curved portion of the lower element 398 when viewed along a forward/aft direction 352 (FIG. 2). In FIGS. 11-12 showing the parabolic shape 452 and semi-circular shape 454 of the lower element 398, the lower portion chord 416 may be described as the chord at the lowest point of the lower element 398 when viewed along a forward/aft direction 352. In FIG. 13 showing the trapezoidal shape 456 of the lower element 398, the lower portion 412 chord 416 may be described as the chord at a midpoint 459 of a lower segment 457 of the lower element 398 when viewed along a forward/aft direction 352, as described below.

The outboard end chord 410 may be described as the chord of the lower element 398 at the location of the intersection of the wing lower surface 214 with the outer surface 430 (FIG. 3) of the lower element 398. For embodiments wherein the upper winglet 302 is contiguous with the lower element 398 as shown in FIG. 3, the outboard end chord 410 may by substantially equivalent in length to the upper winglet root chord 308. However, as indicated below, the outboard end chord 410 may by different than the upper winglet root chord 308.

In FIG. 4, the wing 200 may include a front spar 226 and a rear spar 228. As described in greater detail below, the upper winglet 302 and the lower element 398 may also each include internal structure such as a front spar 320 and a rear spar 324 and which may be coupled to the front and rear spar 226, 228 of the wing 200 for load transfer. In some examples, the upper winglet 302 and the lower element 398 may be formed as a unitary structure. In this regard, the upper winglet 302 and the lower element 398 may include internal load-carrying structure. For example, in some examples, the internal structure of the upper winglet 302 and the lower element 398 may be machined out of metallic material such as from one or more monolithic aluminum or titanium castings or blocks. Alternatively, the upper winglet 302 and lower element 398 may be formed as a unitary structure from fiber-reinforced polymer matrix material such as carbon fiber-reinforced plastic. In some examples, the internal structure such as the front spar 320, the rear spar 324, the ribs (not shown), and the skin of the upper winglet 302 and the lower element 398 may be integrally-formed as a unitary structure. Advantageously, by forming the wing tip device 300 as a unitary structure, manufacturing, assembly, and installation of the wing tip device 300 may be simplified.

In some examples, the length of the root chord 308 of the upper winglet 302 and/or the length of the chord 410 at the outboard end 408 (FIG. 3) of the lower element 398 may be generally equivalent to the length of the wing tip chord 218. However, the wing tip device 300 may be configured such that the upper winglet 302 root chord 308 and/or the outboard end chord 410 have a different length than the wing tip chord 218. As shown in FIG. 7, the wing 200 may be tapered. At the location of the wing tip joint 356, the upper winglet 302 may be configured to form a continuation of the taper of the wing 200 as shown in FIG. 7. In this regard, the length of the upper winglet 302 root chord 308 and/or the outboard end chord 410 may be slightly shorter than the length of the wing tip chord 218. In some examples (not shown), the upper winglet 302 root chord 308 and the outboard end chord 410 may each have a length of from approximately 60 to 100 percent of a length of the wing tip chord 218. In some embodiments, the upper winglet 302 root chord 308 and/or the outboard end chord 410 may each have a length that is no less than approximately 50 percent of the wing tip chord 218. In some examples, the outboard end chord 410 may be shorter than the upper winglet root chord 308. Alternatively, the outboard end chord 410 may be longer than the upper winglet root chord 308.

In some examples, the lower element 398 may be configured such that the chord 416 (FIG. 2) of the airfoil section 414 (FIG. 2) at the lower portion 412 (FIG. 2) may be less than the chord 405 at the inboard end 404 and/or the chord 410 at the outboard end 408 (FIG. 2) of the lower element 398 (FIG. 2). In this regard, the lower element 398 may be configured such that the chord length of the airfoil section is gradually reduced along a direction from the inboard and outboard ends 404, 408 toward the lower portion 412. In some examples, the chord 405 of the inboard end 404 may be substantially equivalent to the wing chord at the location where the inboard end 404 is joined to the wing 200. However, the chord 405 of the inboard end 404 may be shorter than the chord of the wing 200 at the location where the inboard end 404 is joined to the wing 200.

FIGS. 5-6 show an embodiment of a wing tip device 300 separated from a wing 200. The wing tip device 300 may be joined to the wingtip at a wing tip joint 356. In the example shown, the wing tip device 300 may be configured such that the upper winglet 302 and the lower arc 400 are removably attachable to the wing 200 at the wing tip joint 356 using mechanical fasteners 362. As indicated above, the wing 200 may include internal load-carrying structure such as a front spar 226, a rear spar 228, stringers, and/or internal ribs. The wing tip device 300 may also include internal structure such as a front spar 320, a rear spar 324, and/or a mid spar 322 for supporting the upper winglet 302 and the lower arc 400. The wing tip device 300 may be joined to the wing 200 by coupling an outboard end attachment 360 of the upper winglet 302 and outboard end 408 to the wing tip 216, and by coupling an inboard end attachment 358 of the lower arc 400 to an underside of the wing 200. For example, the inboard end attachment 358 may be coupled to the wing 200 at a reinforcing doubler 368 and/or internal rib that may be included with the internal structure of the wing 200. The inboard end 404 attached may also be coupled to the wing 200 structure such as to the front spar 226, the rear spar 228, and/or other structure. The wing tip joint 356 includes the coupling of the inboard end attachment 358 and the outboard end attachment 360 to the wing 200.

FIGS. 7-8 show the attachment of the wing tip device 300 to the wing 200 structure using mechanical fasteners 362 such as tension bolts and/or shear bolts. In some examples, the wing 200 may include one or more removable access panels (not shown) which may be removed from an underside of the wing 200 to allow access to the interior of the wing 200. In this manner, mechanical fasteners 362 may be installed from the wing interior as a means to couple the outboard end attachment 360 of the wing tip device 300 to the wing tip 216. For example, one or more tension fasteners may be extended through an end rib 230 of the wing tip 216 and may be threadably engaged to barrel nuts (not shown) or other threaded members (not shown) that may be included with an end rib 364 of the wing tip device 300. To couple the inboard end attachment 358 to the wing 200, one or more mechanical fasteners 362 may be extended through the inboard end attachment 358 from an exterior side of the wing 200. The mechanical fasteners 362 may be extended into a reinforcing doubler 368 or other wing structure such as the front spar 226, the rear spar 228, and/or one or more wing ribs. As may be appreciated, the wing tip device 300 may be coupled to the wing 200 using any one of a variety of different attachment mechanisms, and is not limited to the use of mechanical fasteners 362. For example, in some embodiments, the inboard and outboard end attachments 358, 360 may be adhesively-bonded to the wing 200, or may be or co-bonded or co-cured during a composite manufacturing process using fiber-reinforced polymer matrix material such as graphite/epoxy to couple the wing tip device 300 to the wing 200.

FIGS. 9-10 show an embodiment of a wing tip device 300 having a tip extension 354. The tip extension 354 may be integral with the lower arc 400 and may extend between the inboard end 404 and the outboard end 408 of the lower arc 400. The tip extension 354 may provide additional lift in combination with the additional lift provided by the upper winglet 302 and the lower element 398. The additional lift provided by the tip extension 354, the upper winglet 302 and/or the lower element 398 may result in an increase in the payload capacity of the aircraft and/or an increase in the range and/or fuel efficiency of the aircraft 100. In addition, as indicated above, by providing the wing tip device 300 with a lower element 398, the generation of tip vortices from a downwardly-extending winglet (not shown) may be avoided which may reduce the magnitude of induced drag and thereby result in a further increase in payload, range, and/or fuel efficiency of the aircraft 100. Furthermore, by providing the wing tip device 300 as a lower element 398 attached to the wing at both the inboard end 404 and the outboard end 408, the lower element 398 may have improved structural stability than a downwardly-extending winglet (not shown), and may therefore be lighter in weight than a downwardly-extending winglet (not shown) which may be supported on a single end and cantilevered outwardly from a wing tip.

In the example shown in FIGS. 9-10, the wing tip joint 356 may be located inboard of the inboard end 404 of the lower element 398. In some embodiments, the tip extension 354 may be integrally-formed with the upper winglet 302 and the lower arc 400 as shown in the figures. However, in other embodiments, the tip extension 354 may be provided as a separate component (not shown) which may be assembled with the upper winglet 302 and the lower arc 400. For example, a separate tip extension (not shown) may be provided such that an outboard end of such a tip extension is attached (e.g., mechanically fastened, adhesively bonded, etc.) to the upper winglet 302, and an inboard end of such a tip extension may be coupled to the wing tip 216. The inboard end 404 of the lower arc 400 may be attached (e.g., mechanically fastened, adhesively bonded, etc.) to the underside of the tip extension 354.

For embodiments of the wing tip device 300 that include a tip extension 354, the lower arc 400 forms a closed loop 420 with the wing lower surface 214 of the tip extension 354. The tip extension 354 may be sized and configured as an extension of the wing 200. In this regard, the tip extension 354 chord may be tapered along a spanwise direction in a manner similar to the taper of the wing 200. In addition, the tip extension 354 may have the same dihedral angle 210 and the same leading edge and trailing edge sweep angle 204, 208 as the wing 200. However, it is contemplated that the tip extension 354 may be provided in a geometry that is different than and/or is non-continuous with the geometry of the wing 200. In this regard, the geometry of the tip extension 354 is not limited to being a continuation of the wing 200 geometry.

FIG. 10 is an assembled front view of the wing tip device 300 of FIG. 9 joined to the wing tip 216. In the embodiment shown, the wing tip 216 may include an end rib 230. Likewise, the tip extension 354 may include an end rib 366 that may be configured to interface with the end rib 230 of the wing tip 216. In a manner similar to that described above with regard to the wing tip device 300 shown in FIGS. 5-8, mechanical fasteners 362 may be installed from a wing interior to couple the end rib 230 of the wing tip 216 to the end rib of the tip extension 354. However, in any one of the embodiment disclosed herein, other mechanisms may be implemented for coupling the wing tip device 300 to the wing tip 216. For example, the wing tip device 300 may be adhesively-bonded to the wing tip 216, or mechanical features may be included for coupling the wing tip device 300 to the wing tip 216. In some examples, the wing tip device 300 may be integrally-formed with the wing 200 such that no wing tip joint is required.

FIG. 11 is a front view of an embodiment of a wing tip device 300 wherein the lower arc 400 has a parabolic shape 452. As indicated above, the lower element 398 may be formed in any one of a variety of different sizes, shapes, and configurations. For example, the lower element 398 may be formed with curved sections (not shown) that are of similar radii. The curved sections may also have different radii of curvature and/or constantly varying radii (not shown), and are not limited to being formed with the same radius of curvature.

FIG. 12 is a front view of an embodiment of a wing tip device 300 wherein the lower arc 400 has a semi-circular shape 454. Although the embodiments shown in FIGS. 11-13 illustrates the wing tip joint 356 located outboard of the inboard end 404 of the lower arc 400 as described above with regard to FIGS. 5-8, in any one of the embodiments disclosed herein, the wing tip device 300 may include an integrally-formed tip extension 354 and the wing tip device 300 may be coupled to the wing tip 216 in the manner shown in FIGS. 9-10 and described above.

FIG. 13 is a front view of an embodiment of a wing tip device 300 where the lower arc 400 has a trapezoidal shape 456. The lower portion 412 may include the lower segment 457 as described above. In the embodiment shown, the lower segment 457 may be oriented parallel to the wing 200. However, in other embodiments, the lower segment 457 may be oriented non-parallel to the wing 200. For example, the lower segment 457 may be horizontally oriented. As may be appreciated, the lower arc 400 may be provided in any one of a variety of different sizes and shapes. The lower arc 400 may include straight sections, curved sections, or any combination thereof.

Figure 14:
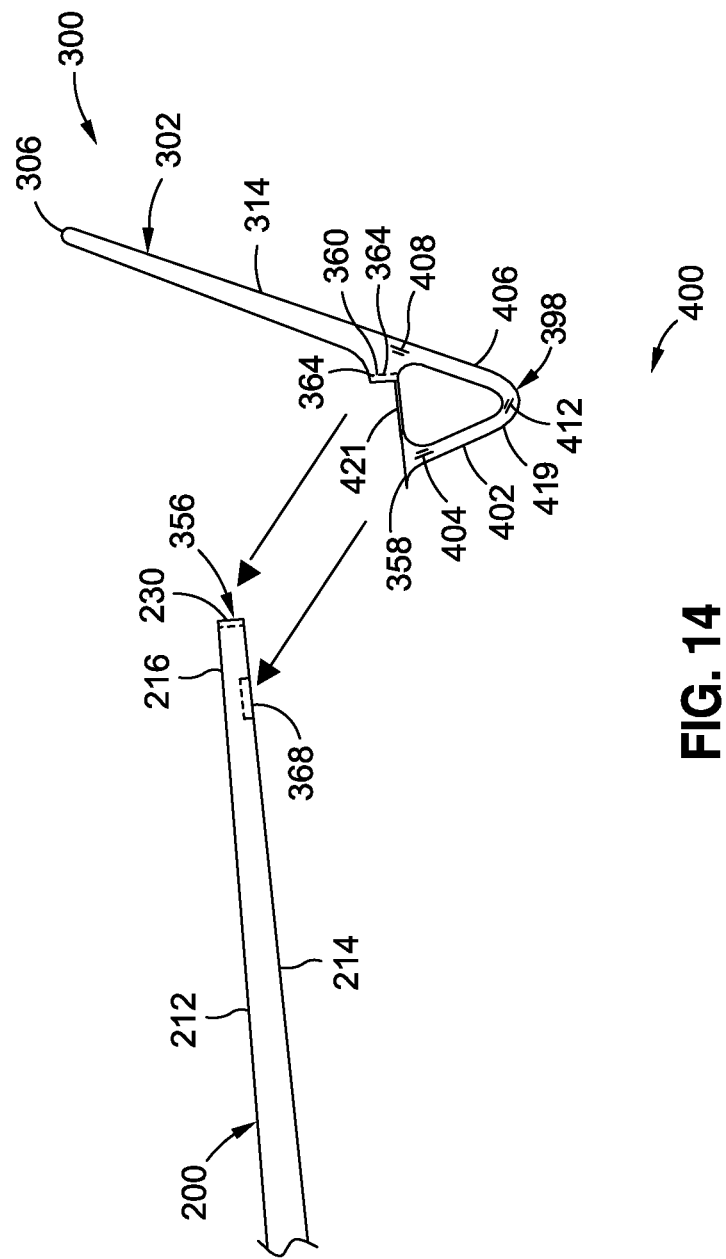
FIG. 14 is a front view of the wing tip device wherein the lower element has a connecting element connecting the inboard end to the outboard end to form a lower loop.

FIG. 14 is a front exploded view of an embodiment of the wing tip device 300 where in the lower element 398 is formed as a lower loop 419 mounted to the wing lower surface 214. The lower loop 419 may include a connecting element 421 that extends between the inboard end 404 and the outboard end 408 of the lower element 398. The connecting element 421 may be mounted to the wing lower surface 214. The cross-sectional shape may be shaped complementary to the airfoil shape of the wing lower surface 214. In some examples, the connecting element 421 may have a relatively thin cross-sectional profile to minimize or avoid the protrusion of the thickness of the connecting element 421 above a desired outer mold line shape (not shown) of the wing lower surface 214, and thereby preserve the aerodynamic shape of the wing lower surface 214. The lower loop 419 may be mounted to the wing 200 in a manner similar to the mounting of the lower arc 400 to the wing 200 as shown in FIG. 5-8. For example, at the outboard end 408, mechanical fasteners (not shown) may be extended through the end rib 230 of the wing tip 216 and into the wing tip device end rib 364. At the inboard end 404, mechanical fasteners (not shown) may be extended into a reinforcing doubler 368. Although not shown, additional fasteners may be extended though the connecting segment 421 and through the wing lower surface 214 into internal wing structure such as stringers or spars (not shown).

As indicated above, the various examples of wing tip devices 300 disclosed herein provide a means for reducing the negative effects of induced drag by effectively increasing the length of the trailing edge 206 of the wing 200. The effective increase in the length of the trailing edge 206 may spread out the distribution of vortices and thereby reduce aerodynamic losses from induced drag and which may improve the performance of the aircraft 100. Additionally, by adding the combination of the upper winglet 302 and lower element 398 to the wings 200 instead of increasing the wing span in the conventional manner by extending the wing tips, the added weight, cost, and complexity associated with the lengthening of leading edge lift-enhancement devices (e.g., slats, Krueger flaps) may be avoided.

Furthermore, by providing the wing tip device 300 as a combination the upper winglet 302 and the lower element 398, the length of the upper winglet 302 may be reduced which may reduce the magnitude of the aerodynamic load on the upper winglet 302 and therefore may allow for a reduction in wing bending such as under high-lift conditions. The reduction in wing bending may reduce the strength and/or stiffness requirements of the wing 200 which may thereby allow for a reduction in the structural weight of the wings 200. In addition, the reduction in the length of the upper winglet 302 due to the addition of the lower element 398 may lower the center of gravity 326 of the upper winglet 302 and thereby reduce the distance 328 (FIG. 7) from the upper winglet 302 center of gravity 326 to the torsional axis 222 (FIG. 7) of the wing 200 which may improve the flutter characteristics of the wing 200. Even further, by reducing the length of the upper winglet 302 due to the addition of the lower element 398, the inertial effects of the upper winglet 302 may be reduced which may allow for a reduction in ballast (not shown) as may otherwise be required to be added to the leading edge of the wing tip 216 for flutter control purposes.

Figure 15:
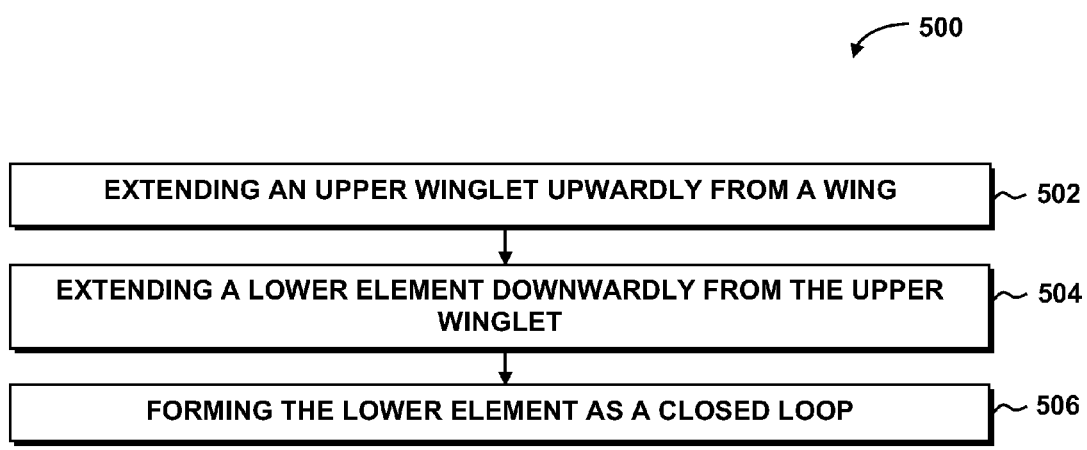
FIG. 15 is a flowchart illustrating one or more operations that may be included in a method of configuring a wing of an aircraft.

FIG. 15 is a flowchart illustrating one or more operations that may be included in a method 500 of configuring a wing 200 of an aircraft 100. The method 500 may include manufacturing and/or assembling an aircraft wing 200 to include a wing tip device 300 as described above. In some examples, the wing tip device 300 may be manufactured separately from the wing 200. In other examples, the wing 200 and the wing tip device 300 may be co-manufactured during the process of fabricating the wing 200. The method 500 of configuring the aircraft wing 200 may also include retrofitting the wing tip device 300 to a conventional wing 200 of an aircraft 100 that may have been previously-manufactured and placed in service.

The method 500 may include Step 502 which may include extending an upper winglet 302 upwardly from a wing 200. For example, the method may include manufacturing the upper winglet 302 and assembling the upper winglet 302 to the wing tip 216. The upper winglet 302 may be generally straight as shown in the FIGS. 1-13. However, the upper winglet 302 may be slightly bowed in an inboard or outboard direction and/or the upper winglet 302 may be slightly twisted. As shown in FIG. 3, the method may include orienting the upper winglet 302 at a dihedral angle 316 in the range of from approximately 30 to 90 degrees relative to horizontal. In some examples, as indicated above, the upper winglet 302 may be oriented at a dihedral angle 316 of at least 60 degrees relative to horizontal. However, the upper winglet 302 may be oriented at any angle, without limitation.

Step 504 of the method 500 may include extending a lower element 398 downwardly from the upper winglet 302 as shown in FIG. 3. As indicated above, the lower element 398 may be formed as a lower arc 400 may be described as an inverted arc. The lower element 398 may have an airfoil cross-section such that the lower element 398 may generate positive lift. The lower element 398 may include an inboard portion 402, an outboard portion 406, and a lower portion 412. The inboard portion 402 may include an inboard end 404. The outboard portion 406 may include an outboard end 408. The wing tip device 300 may be configured such that when assembled to the wing 200, the lower element 398 is located under the wing 200.

Step 506 of the method 500 may include forming the lower element as a lower arc 400 such that when attached to the wing, a closed loop 420 is formed with the wing lower surface 214 of the wing 200 (FIG. 8) or with a lower surface of a tip extension 354 (FIG. 9). As indicated above, the closed loop 420 may have a hollow interior 418 when viewed along a forward/aft direction 352 (FIG. 2) to allow airflow to pass through the closed loop 420 such that the lower element 398 may generate aerodynamic lift. In some examples, the method may include forming the upper winglet 302 and the lower element 398 as a unitary structure as shown in FIG. 6. For example, the upper winglet 302 and lower element 398 may be integrally formed as a one-piece structure. However, in other examples, the upper winglet 302 and lower element 398 may be formed as separate structures that may be assembled or attached to the wing 200. The method may also include configuring the lower element 398 such that the closed loop 420 has a desired geometric shape when viewed from the forward/aft direction 352. For example, the method may include forming the closed loop 420 in a triangular shape 450, a rounded shape, a parabolic shape 452, a semi-circular shape 454, a trapezoidal shape 456, or in any one of a variety of other shapes.

In some examples, the method may include removably attaching the upper winglet 302 and the lower element 398 to the wing 200 at a wing tip joint 356 as shown in FIGS. 5-10. For example, in the embodiment shown in FIG. 5-8, the method may include attaching the upper winglet 302 and the outboard end 408 of the lower arc 400 to the wing tip 216, and attaching an inboard end 404 of the lower arc 400 to an underside of the wing 200 at a location inboard of the wing tip 216. In some examples, the inboard end 404 of the lower arc 400 may be coupled to the wing 200 internal structure such as to a front spar 226, a rear spar 228, and/or to internal ribs and stringers of the wing main structure. As described above, mechanical fasteners 362 may be used to couple the upper winglet 302 and lower arc 400 to the wing 200.

In other examples, the method may include fabricating the winglet device with a tip extension 354 extending from the upper winglet 302 to an inboard end 404 of the lower arc 400 as shown in FIGS. 9-10. The tip extension 354 may be integral with the upper winglet 302 and lower arc 400. In this regard, the tip extension 354 and the lower arc 400 may collectively form the closed loop 420. For such a configuration, the method of joining the wing tip device 300 to the wing 200 may include attaching an inboard end 404 of the tip extension 354 to the wing tip 216. The tip extension 354 may be provided with an airfoil section that may be substantially similar to or may be a continuation of the wing airfoil section, as indicated above.

The method may further include configuring the lower element 398 with a lower portion 412. As shown in FIG. 3, the lower portion 412 may be positioned below the wing lower surface 214 at a vertical distance of no more than approximately 50 percent of a vertical height 304 of the upper winglet 302 when the wing 200 is under a downwardly-deflected ground static loading. In this manner, the lower element 398 of the wing tip device 300 may provide improved clearance with vehicles or objects when the aircraft 100 is on the ground relative to a reduced amount of clearance that would be provided with a downwardly extending winglet (not shown). In some examples, the method may include forming the lower element 398 as a lower arc 400 having an arclength 426 (FIG. 3) that is less than a length 330 of the upper winglet 302. The arclength 426 may be described as the distance along the outer surface 430 between the inboard end 404 and the outboard end 408 of the lower arc 400.

By maintaining the arclength 426 of the lower arc 400 less than a length 330 of the upper winglet 302, the lower arc 400 may have a reduced amount of frontal area and wetted surface area and may thereby generate a reduced amount of parasitic drag and induced drag. However, the lower arc 400 may have an arclength 426 that may be equal to or greater than the length 330 of the upper winglet 302. In some examples, the method may include configuring the lower arc 400 such that the outboard portion 406 is located no further outboard than a tip 306 of the upper winglet 302. In this regard, the upper winglet 302 may be sized and configured to fit within predetermined gate span limits when the aircraft 100 is parked at a gate near a terminal. As known in the art, gate span limits may be predefined by a regulatory agency (e.g., the Federal Aviation Administration) as the maximum wing span that may safely fit within the geometric constraints of a gate location at an airport terminal.

The method 500 may additionally include forming the upper winglet 302 root chord 308 and the outboard end chord 410 to be no less than approximately 50 percent of the wing tip chord 218. For example, FIG. 5 illustrates the outboard end chord 410 as being substantially equivalent to the upper winglet 302 root chord 308. In some examples, the upper winglet 302 root chord 308 and the outboard end chord 410 may each have a length of from approximately 60 to 100 percent of a length of the wing tip chord 218. The method may also include controlling the side profile shape of the upper winglet 302 and the lower arc 400. For example, the method may include forming the upper winglet 302 at a leading edge sweep angle 310 of between approximately 20-70 degrees. In the embodiment shown in FIG. 7, the upper winglet 302 may have a sweep angle 310 that may be greater than the wing leading edge sweep angle 204. However, the upper winglet 302 may have any sweep angle 310, including a forward sweep angle, and is not limited to a sweep angle 310 that is substantially similar to the sweep angle 204 of the wing leading edge 202.

In some examples, the lower element may be formed as a lower loop having a connecting element extending between the inboard end 404 and outboard end 408 of the lower element 398. In some examples the connecting element 421 may be attached to the wing lower surface 214 such as by using mechanical fasteners and/or by adhesively bonding the connecting element to the wing lower surface. The inboard and outboard end 404, 408 may be mechanically, fastened and/or adhesively bonded to the wing as shown in FIG. 15.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A wing tip device for an aircraft wing, comprising:
an upper winglet configured to extend upwardly from an aircraft wing, the upper terminating at a tip configured as a free end of the upper winglet; and
a lower element extending downwardly from the upper winglet and configured to form a closed loop below the wing, the closed loop having a hollow interior, an inboard end of the lower element being joined to a wing lower surface of the wing or to a tip extension of the upper winglet.

2. The wing tip device of claim 1, wherein:
the lower element comprises a lower arc forming the closed loop with a wing lower surface.

3. The wing tip device of claim 1, wherein:
the lower element comprises a lower loop mounted to a wing lower surface.

4. The wing tip device of claim 1, wherein:
the upper winglet and the lower element are formed as a unitary structure.

5. The wing tip device of claim 1, wherein:
the lower element has an outboard portion that is tangent to the upper winglet.

6. The wing tip device of claim 1, wherein:
the upper winglet and the lower element are removably attachable to the wing at a wing tip joint.

7. The wing tip device of claim 6, wherein:
the lower element has an outboard end and an inboard end, the outboard end extending downwardly from the upper winglet; and
the wing tip joint comprising an outboard end attachment of the upper winglet to the wing tip, and an inboard end attachment of the inboard end of the lower element to the wing at a location inboard of the wing tip.

8. The wing tip device of claim 6, further including:
a tip extension extending between the upper winglet and an inboard end of the lower element; and
the wing tip joint being located inboard of the inboard end.

9. The wing tip device of claim 1, wherein:
the closed loop has a triangular shape, a rounded shape, a parabolic shape, a semi-circular shape, or a trapezoidal shape.

10. The wing tip device of claim 1, wherein:
the upper winglet is oriented at dihedral angle in a range of from approximately 30 to 90 degrees relative to horizontal.

11. The wing tip device of claim 1, wherein:
the upper winglet has an upper winglet root chord;
the lower element has an outboard end having an outboard end chord; and
the upper winglet root chord and the outboard end chord each have a length of no less than approximately 50 percent of a wing tip chord.

12. The wing tip device of claim 11, wherein:
the upper winglet root chord and the outboard end chord each have a length of from approximately 60 to 100 percent of a length of the wing tip chord.

13. An aircraft, comprising:
a pair of wings each having a wing tip; and
a wing tip device mounted to each one of the wing tips, the wing tip device including:
an upper winglet configured to extend upwardly from an aircraft wing, the upper winglet terminating at a tip configured as a free end of the upper winglet; and
a lower element extending downwardly from the upper winglet and configured to form a closed loop below the wing, the closed loop having a hollow interior, an board end of lower element being joined to a win lower surface of the wing or to a tip extension of the upper winglet.

14. A method of configuring a wing of an aircraft with a wing tip device, comprising:
extending an upper winglet upwardly from a wings, the upper winglet terminating at a tip configured as a free end of the upper winglet;
extending a lower element downwardly from the upper winglet, an inboard end of the lower element being joined to a wing lower surface of the wing or to a tip extension of the upper winglet; and
forming the lower element as a closed loop.

15. The method of claim 14, further comprising:
forming the lower element as a lower arc mounted to a wing lower surface.

16. The method of claim 14, further comprising:
forming the lower element as a lower loop mounted to a wing lower surface.

17. The method of claim 14, further including:
forming the upper winglet and the lower element as a unitary structure.

18. The method of claim 14, further including:
forming an outboard portion of the lower element tangent to the upper winglet.

19. The method of claim 14, further including:
removably attaching the upper winglet and the lower element to the wing at a wing tip joint.

20. The method of claim 19, further including:
attaching an outboard end of the upper winglet to the wing tip; and
attaching an inboard end of the lower element to the wing at a location inboard of the wing tip.

21. The method of claim 19, further including:
including a tip extension from the upper winglet to an inboard end of the lower element in a manner such that the tip extension and the lower element collectively form the closed loop; and
attaching an inboard end of the tip extension to the wing tip.

22. The method of claim 14, further including:
configuring the lower element such that the closed loop has a triangular shape, a rounded shape, a parabolic shape, a semi-circular shape, or a trapezoidal shape.

23. The method of claim 14, further including:
orienting the upper winglet at a dihedral angle in a range of from approximately 30 to 90 degrees relative to horizontal.

24. The method of claim 14, further including:
forming an upper winglet root chord and a lower element chord at no less than approximately 50 percent of a wing tip chord.

* * * * *